United States Patent [19]
Wu

[11] Patent Number: 5,764,461
[45] Date of Patent: Jun. 9, 1998

[54] PROTECTION CIRCUIT FOR A SWITCH MODE POWER SUPPLY

[75] Inventor: Chun Hsing Wu, Singapore, Singapore

[73] Assignee: Thomson multimedia S.A., Courbevoie, France

[21] Appl. No.: 622,911

[22] Filed: Mar. 27, 1996

[30] Foreign Application Priority Data

Apr. 29, 1995 [SG] Singapore .................. 9500371-1

[51] Int. Cl.$^6$ .................................................. H02H 7/00
[52] U.S. Cl. ........................... 361/18; 361/93; 307/86
[58] Field of Search ............................ 361/18, 87–88, 361/93; 363/23, 41, 50; 307/85–86, 116, 125, 130

[56] References Cited

U.S. PATENT DOCUMENTS 5,307,256  4/1994  Silverstein .................. 363/21

FOREIGN PATENT DOCUMENTS 0319671  6/1989  European Pat. Off.
2257859  1/1993  United Kingdom.

OTHER PUBLICATIONS

Copy of Search Report.

*Primary Examiner*—Jeffrey A. Gaffin
*Assistant Examiner*—Michael J. Sherry
*Attorney, Agent, or Firm*—Joseph S. Tripoli; Frederick A. Wein

[57] ABSTRACT

A controller, which is normally used for controlling different modes is used for circuit protection. The suipply voltage and control signals from the switched mode power supply to the controller are modified when a short circuit occurs. In response thereto, the controller switches "off" a mode-control signal and the switched mode power supply operates in standby mode.

2 Claims, 2 Drawing Sheets

PROTECTION CIRCUIT FOR A SWITCH MODE POWER SUPPLY

BACKGROUND The present invention relates to a protection circuit for a switch mode power supply.

Switch mode power supplies, also called SMPS, are well known. Such a power supply includes a switch, which is normally realized by a transistor and which is generally connected to the primary windings of a transformer, secondary windings of which deliver desired voltages for further electrical stages.

Quite often, the power supply delivers several output voltages, e.g. by different secondary windings. An adequate overload protection circuit for the power supply must distinguish between different modes, e.g. standby mode, low consumption mode, high consumption mode, etc. It may happen, for example in a TV-set, that in normal mode the power consumption may exceed 180 Watt. An according overload protection will be activated when the power taken out from the power supply exceeds 250 Watts. In a low consumption mode, the power consumption is about 10 Watts. If a short circuit somewhere in the device happens, the set power is still below 180 Watts.

SUMMARY OF THE INVENTION

So, it is the object of this invention to present a protection circuit which is easy to realize.

According to the present invention a device, like e.g. a TV-set, is driven from normal mode to standby mode, when an abnormal operation, like an overload or even a short, occurs. In normal mode, the TV-set processes video- and/or audio signals. In standby mode, only a microprocessor and according signal receiving means are to be supplied with low power.

The object is solved in a preferred embodiment by means of a control stage, which is normally used for controlling different operation modes selected by a user. The power supply generates different voltages, where according control signals for the control stage are derived from. By these control signals the control stage may be activated to provide a signal for switching the power supply from normal mode to standby mode.

BRIEF DESCRIPTION OF THE DRAWINGS

Further details and advantages will now be described by the description of embodiments with the aid of the drawings.

DESCRIPTION OF THE PREFERRED EMBODIMENT(S)

Figure 1:
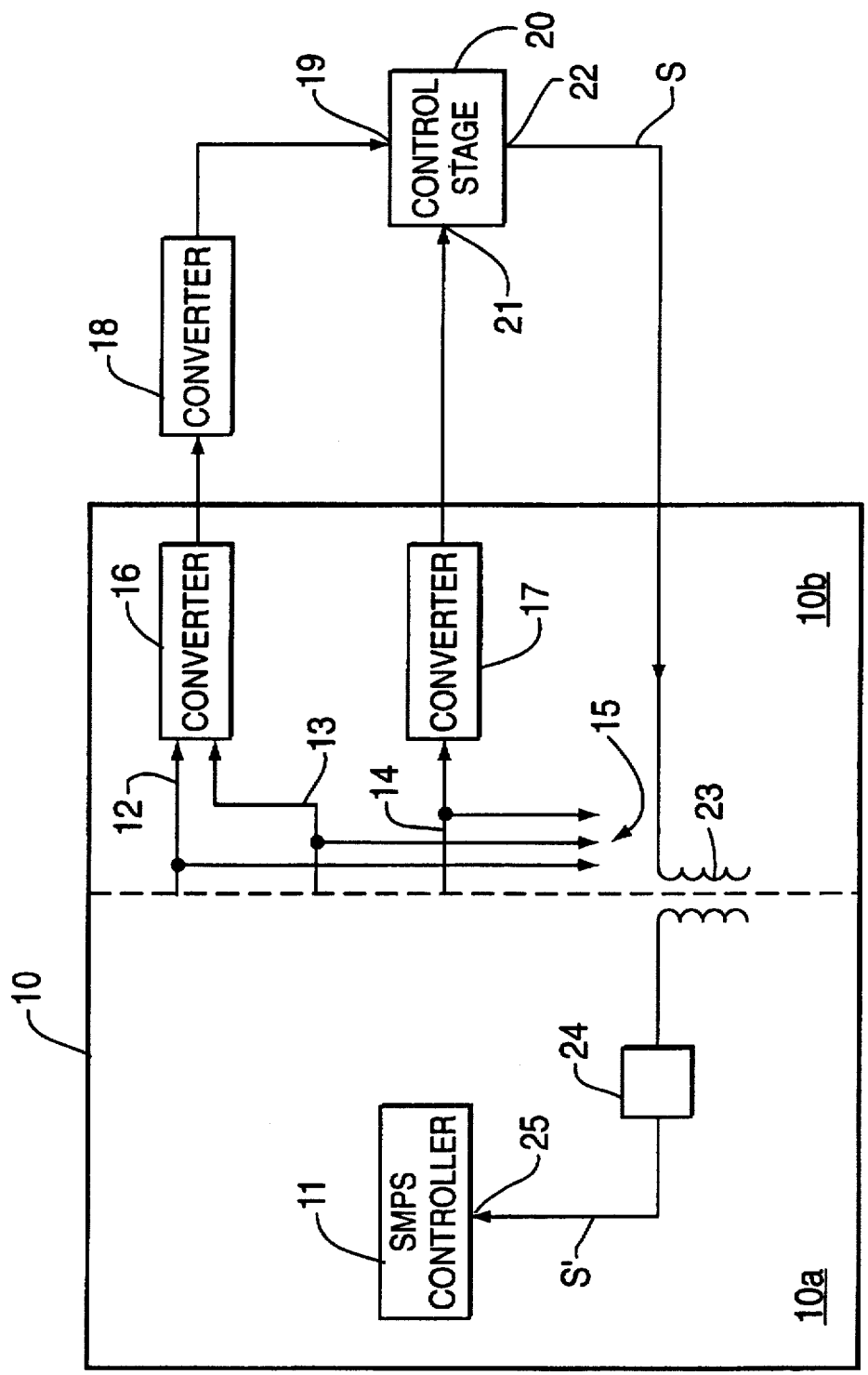
FIG. 1 shows a block diagram of a first embodiment of the invention.
Figure 2:
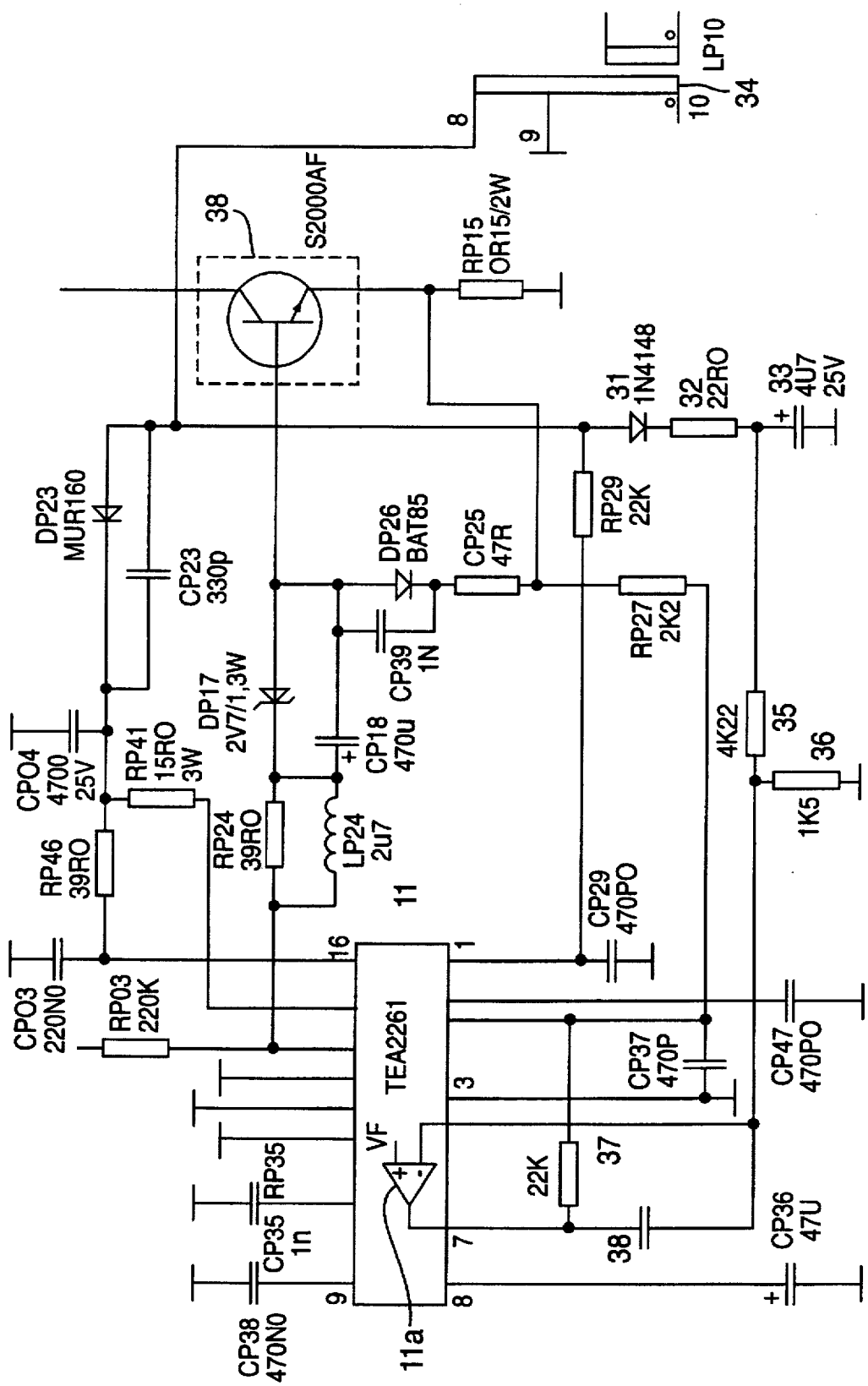
FIG. 2 shows parts of a circuit diagram of a second embodiment.

FIG. 1 shows a block diagram of a preferred embodiment. A switch mode power supply (SMPS) 10, having a primary part 10a and a secondary part 10b, includes a SMPS controller 11, which can be realised by an integrated circuit (IC) of the type TEA 2261. The SMPS 10 generates different voltages, which are provided at lines 12, 13 and 14 respectively. These voltages are led via a terminal 15 to further, not shown, stages. In addition, the first voltage of line 12 and the second voltage of line 13 are connected to a first converter 16, which may include a transistor of the type BC 368. The third voltage of line 14 is connected to a second converter 17, which may include a transistor of the type BC 847B.

The output signal of the first converter 16 is led to a third converter 18, including a transistor BC 368 in this embodiment. An according output signal of the converter 18 is led to a first input terminal 19 of a control stage 20. This stage 20 is realized in a preferred embodiment by an IC of the type STV 2160 and the first input terminal 19 is identical with STV 2160-pins 13 and 15.

The output signal of the second converter 17 is connected to a second input 21 terminal of stage 20, which is identical with STV 2160-pin 19.

An output terminal 22, which is STV 2160-pin 31, delivers a pulse width modulation (PWM) signal, which is called standby-signal S and which is led via a transformer 23 input terminal (TEA 2261-pin 2) 25 of the controller 11.

Now, the function of the embodiment of FIG. 1 will be explained.

1. Normal operation mode

The device which is voltage-supplied by the SMPS 10 is on and no unusual power consumption occurs, e.g. by a short. Then a supply voltage for the stage 20 is delivered by the first converter 16 and further processed by the converter 18. A so-called Breathing signal is delivered to input 21 (IC STV2160-pin 19) of the control stage 20.

The control stage 20 delivers the signal S, which is converted by the transformer 23 to the signal S' and which enables the SMPS controller to drive the SMPS 10 in normal operation mode, so that the device to be voltage-supplied is on.

2. Short circuit on line 12

The first converter 16 cuts the supply voltage for the stage 20. Thereby the signal S and therewith S' disappear. Due to the missing signal S' the SMPS controller 11 switches the SMPS 10 into standby-mode.

3. Short circuit on line 13

It happens the same as described above. This means that the first converter 16 cuts the supply voltage for the stage 20. Thereby the signal S and therewith S' disappear. Due to the missing signal S' the SMPS controller 11 switches the SMPS 10 into standby-mode.

4. Short circuit on line 14

The transistor included in the second converter 17 switches the Breathing signal to ground. This triggers the protection of controller 20 to shutdown the signal S. This results in the standby mode, controlled by the SMPS controller 11.

By this embodiment, the characteristic is used, that the controller 20 (IC STV 2160) shutsdown the normal mode control signal, also called SMPS-signal under certain conditions. These conditions are controlled in dependence on the presence or absence of voltages to be provided at the output terminal 15.

A second embodiment is realised such that the overload protection is more sensitive in standby mode than in normal mode.

Means with the same function as in FIG. I have got the same reference numbers. In the following only means are explained, which are essential for the second embodiment.

For making the protection circuit more sensitive, the SMPS 10 provides voltages, values of which are much different in standby mode, compared to normal mode.

In this embodiment the standby regulation circuit consists of diode 31, resistor 32 and capacitor 33. These 3 components detect the peak voltage from a switch mode power transformer (SMPT) 34 and use resistors 35, 36 as devider.

The common connection of resistors 35, 36 is connected to IC TEA2261-pin 6 of controller 11.

A secondary regulation circuit consists of a voltage devider (not shown) to sens a system voltage, generated by the SMPS 10. The voltage of the voltage devider is delivered to the IC STV2160-pin 26 of stage 20. Stage 20 compares the pin 26 voltage with an internal reference voltage and converts this difference signal to pulse width to drive transformer 23 (see FIG. 1).

To make the protection circuit more sensitive, this embodiment amplifies the current sensing input voltage in standby mode and lowers it down in normal operation mode.

This is achieved by connecting a resistor 37 from the output terminal of an error amplifier 11a (IC-pin 7) of SMPS controller 11 to the current sensing input pin (IC-pin 3) of controller 11.

This has the following reason. During standby mode the error amplifier 11a detects the voltage across capacitor 33. If overload conditions occur, this voltage will be below the normal standby voltage. Thereby the error amplifier 11a will raise up its output voltage to try to compensate the voltage drop. When the output voltage of the error amplifier 11a increases, the driving pulses of a switch transistor 38 will increase; thereby the energy stored in the switch mode power transformer 34 will increase. But the current sensing input pin (IC-pin 3), which senses the current through SMPT 34, also detects the increase. Thereby it adds up the bias voltage from error amplifier 11a through resistor 37 and will reach the protection threshold level, so that it cuts off the current increase trend. In the same time the protection timer circuit (included in controller 11) starts. After a given time, the operating will shutoff permanently. The bias from error amplifier to the current sensing input is so significant, that a slightly increase in the SMPT 34 will trigger the current protection circuit. So, it makes the protection very sensitive in standby mode.

In order to make the protection more different in standby mode than in normal operation mode, the gain of the error amplifier 11a must be increased. In this case the oscillation trend must be suppressed. That is why a capacitor 38 is connected between the IC-pins 6 and 7 of controller 11.

So, the behaviour of the error amplifier 11a is like a comparator. During standby mode, the output of amplifier 11a will be either low (0 Volt) or high (4 Volt). Further more, in order to minimize the oscillation trend, there is a hysteresis input operation required, which is already originally designed in the controller 11 of the type TEA 2261 to operate the burst mode.

In normal operation mode, which means that the device supplied via the terminal 15 is on, the system operating voltage is set at a higher level. Therby the capacitor 33 will have a higher voltage than in standby mode. That means, the output of the error amplifier 11a will always be at low state. Due to the low output of the amplifier 11a the resistor 37, which is between the amplifier-output and the current sensing input will work as devider. This makes the current sensing function less sensitive.

I claim:

1. A protection circuit for a switch mode power supply for supplying electrical means with voltages on designated lines, said power supply comprising:

a first controller operable in a standby mode or a normal operation mode depending upon the presence or absence of a first control signal coupled from a second controller, and a supply voltage for the second controller being supplied by the power supply, the supply voltage being switched "off" when a short circuit occurs on at least one of the voltages of the designated lines so that the first control signal ceases and the power supply switches into the standby mode.

said first controller including an error amplifier and a current sensing input point, and a resistor coupled between an output of said amplifier and said current sensing input point.

2. Circuit according to claim 3 wherein a control signal from the power supply to the second controller is switched "off" in the event of a short circuit on the voltages of said lines, so that said second controller switches the first control signal "off", and the power supply switches into the standby mode.

* * * * *